United States Patent
Kim

(10) Patent No.: US 7,711,398 B2
(45) Date of Patent: May 4, 2010

(54) BODY ROTATION TYPE PORTABLE TERMINAL

(75) Inventor: Myung-Han Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 620 days.

(21) Appl. No.: 11/325,783

(22) Filed: Dec. 30, 2005

(65) Prior Publication Data

US 2006/0146030 A1   Jul. 6, 2006

(30) Foreign Application Priority Data

Dec. 30, 2004  (KR)  ........................ 10-2004-0116949

(51) Int. Cl.
*H04M 1/00* (2006.01)
(52) U.S. Cl. .................. 455/575.3; 455/575.1; 455/566
(58) Field of Classification Search .............. 455/575.3, 455/575.1, 566
See application file for complete search history.

(56) References Cited

U.S. PATENT DOCUMENTS

| | | | | |
|---|---|---|---|---|
| 7,158,816 B1 * | 1/2007 | Mizuta et al. | ............. | 455/575.3 |
| 7,174,195 B2 * | 2/2007 | Nagamine | ................. | 455/575.1 |
| 7,200,423 B2 * | 4/2007 | Bum | ........................... | 455/566 |
| 7,414,656 B2 * | 8/2008 | Lee et al. | ................ | 348/333.06 |
| 2003/0001817 A1 * | 1/2003 | Jeon | ............................ | 345/156 |
| 2003/0223576 A1 * | 12/2003 | Totani | ..................... | 379/433.04 |
| 2004/0224732 A1 * | 11/2004 | Lee et al. | .................. | 455/575.3 |
| 2005/0113156 A1 * | 5/2005 | Park et al. | ................. | 455/575.4 |
| 2005/0124392 A1 * | 6/2005 | Jeong | ...................... | 455/575.1 |

FOREIGN PATENT DOCUMENTS

| | | |
|---|---|---|
| CN | 140281 | 5/2003 |
| CN | 1471286 | 1/2004 |
| CN | 1471288 | 1/2004 |
| JP | 2003-134214 | 5/2003 |
| JP | 2003-198690 | 7/2003 |
| JP | 2004-104164 | 4/2004 |

* cited by examiner

*Primary Examiner*—Lana N Le
(74) *Attorney, Agent, or Firm*—Lee, Hong, Degerman, Kang & Waimey

(57) ABSTRACT

A portable terminal comprises: a terminal body having a keypad; a display unit having a display screen for displaying information; and a hinge unit mounted between the terminal body and the display unit, rotatably supporting the display unit so as to dispose the display unit crosswise, and rotatably supporting the terminal body so as to dispose the terminal body crosswise, thereby rotating the terminal body to be disposed crosswise as well as the display unit. Accordingly, the portable terminal can facilitate a key manipulation during a game or the like and additionally perform various functions.

7 Claims, 6 Drawing Sheets

BODY ROTATION TYPE PORTABLE TERMINAL

CROSS-REFERENCE TO RELATED APPLICATIONS

Pursuant to 35 U.S.C. §119(a), this application claims the benefit of the Korean Patent Application No. 116949/2004, filed on Dec. 30, 2004, which is hereby incorporated by reference as if fully set forth herein.

FIELD OF THE INVENTION

The present invention relates to a portable terminal, and particularly, to a hinge unit of a portable terminal capable of rotating a terminal body as well as a display unit.

BACKGROUND OF THE INVENTION

In general, a portable terminal is divided into a variety of types according to its opening and closing method, such as a flip type in which a cover is mounted to a body, a folder type in which a folder provided with display screen is mounted to a body, a slide type in which a display unit provided with a display screen is opened or closed in a slide method. As a terminal provides various services, a folder rotation type providing a wide screen for viewing video or video communication has been being developed and released.

FIG. 1 is a perspective view of a folder rotation type portable terminal in accordance with the conventional art.

As shown in FIG. 1, the portable terminal in accordance with the conventional art includes: a terminal body 110 having a printed circuit board (PCB) provided with various circuit components and having a keypad 102 at its front surface; a display unit 120 rotatably connected to an upper end of the terminal body 110 and provided with a display screen 122 for displaying information desired by a user; and a hinge unit 130 installed between the terminal body 110 and the display unit 120, for rotating the display unit 120 relative to the terminal body 110 and also disposing the display unit 120 crosswise by rotating the display unit at a right angle so that a wide screen is offered.

The hinge unit 130 includes: a first hinge portion 132 for rotatably connecting the display unit 120 with the terminal body 110; and a second hinge portion 134 connected to the first hinge portion 132, for disposing the display unit 120 crosswise by rotating the display unit 120 at a right angle so that the display unit 120 is presented in a wide screen mode.

In the folder rotation type portable terminal in accordance with the conventional art having such a structure, the display unit 120 can be opened and closed relative to the terminal body 110 by the first hinge portion 132, and the display unit 120 is disposed crosswise by being rotated at a right angle by the second hinge portion 132.

However, the folder rotation type portable terminal in accordance with the conventional art having such a structure is disadvantageous in that various functions cannot be provided because the terminal body 110 is disposed lengthwise all the time, although the display unit is rotated at a right angle and disposed crosswise.

Namely, the terminal body 110 cannot be rotated and thus cannot be disposed crosswise, which makes it inconvenient for the user to manipulate the keys when functions requiring many key manipulations, such as a game, are carried out.

SUMMARY OF THE INVENTION

Therefore, an object of the present invention is to provide a portable terminal capable of facilitating a key manipulation during a game or the like and additionally performing various functions by rotating a terminal body to be disposed crosswise as well as a rotating a display unit.

To achieve these and other advantages and in accordance with the purpose of the present invention, as embodied and broadly described herein, there is provided a portable terminal comprising: a terminal body having a keypad; a display unit having a display screen for displaying information; and a hinge unit mounted between the terminal body and the display unit, rotatably supporting the display unit so as to dispose the display unit crosswise, and rotatably supporting the terminal body so as to dispose the terminal body crosswise.

The hinge unit comprises: a display unit hinge portion for rotatably supporting the display unit; a terminal body hinge portion for rotatably supporting the terminal body; and a hinge connection portion connected between the display unit hinge portion and the terminal body hinge portion, for connecting the two hinge portions to each other such that they can be rotated relative to each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The invention will be described in detail with reference to the following drawings in which like reference numerals refer to like elements, wherein.

DETAILED DESCRIPTION OF THE EMBODIMENTS

Reference will now be made in detail to the preferred embodiments of the present invention, examples of which are illustrated in the accompanying drawings.

Figure 1:
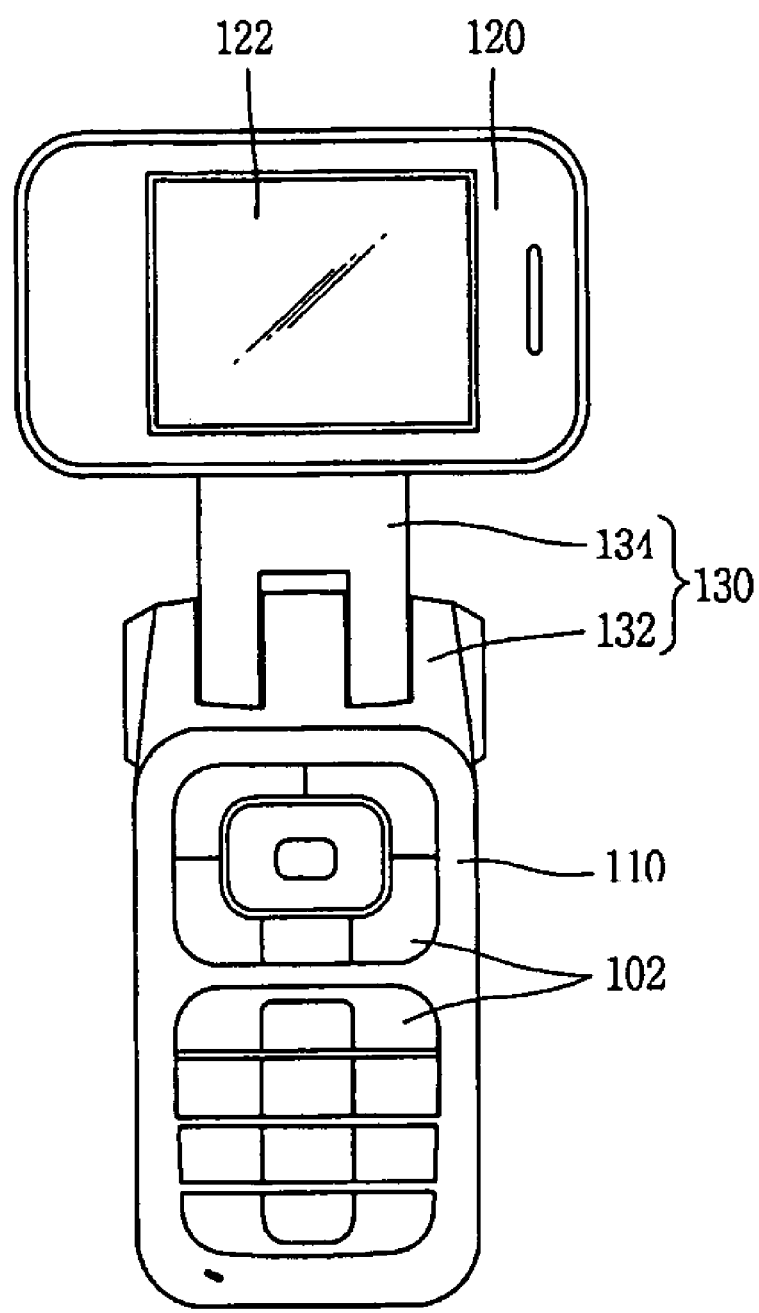
FIG. 1 is a perspective view of a portable terminal in accordance with the conventional art.
Figure 2:
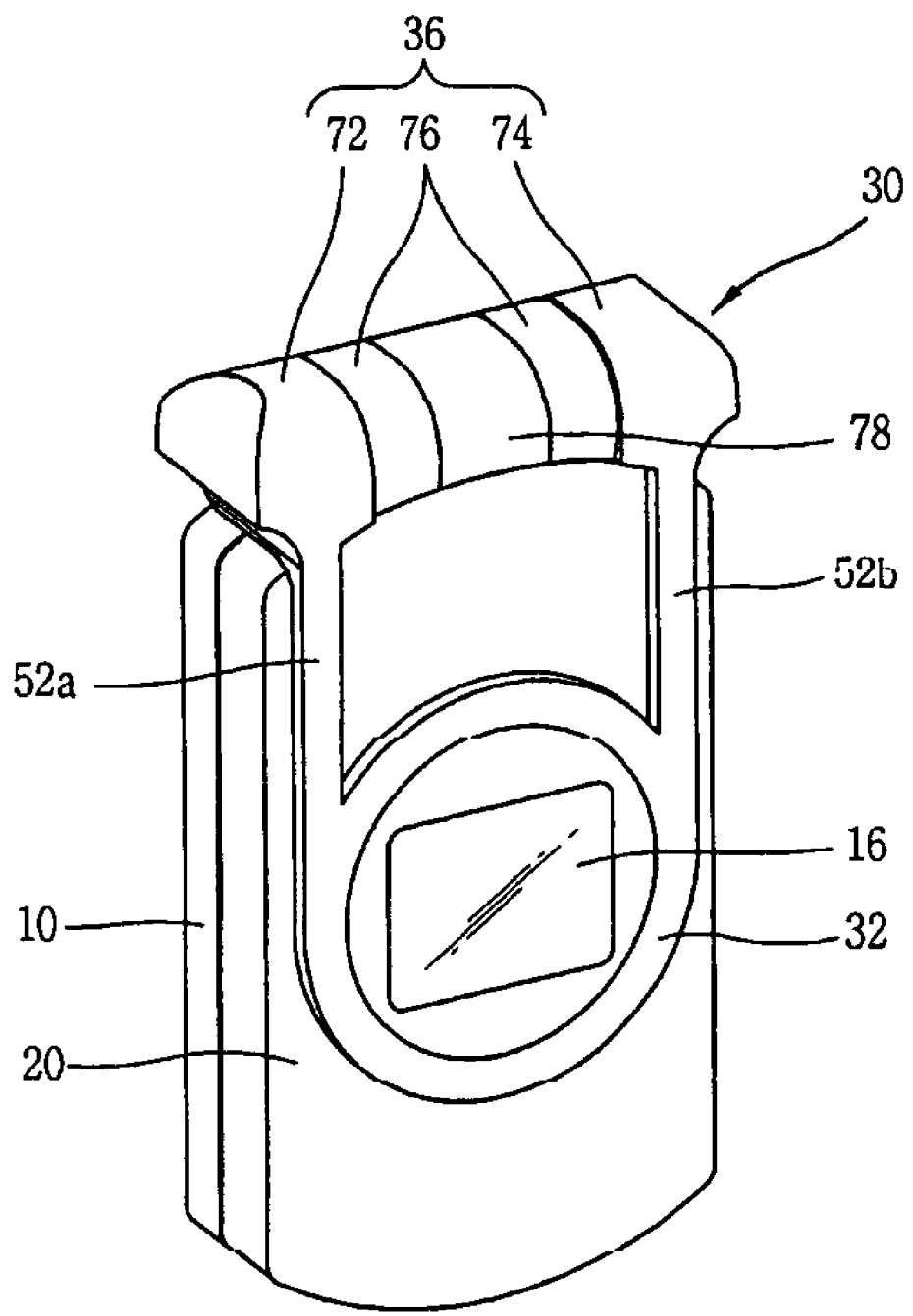
FIGS. 2 and 3 are perspective views showing a portable terminal in accordance with the present invention in a closed position.
Figure 3:
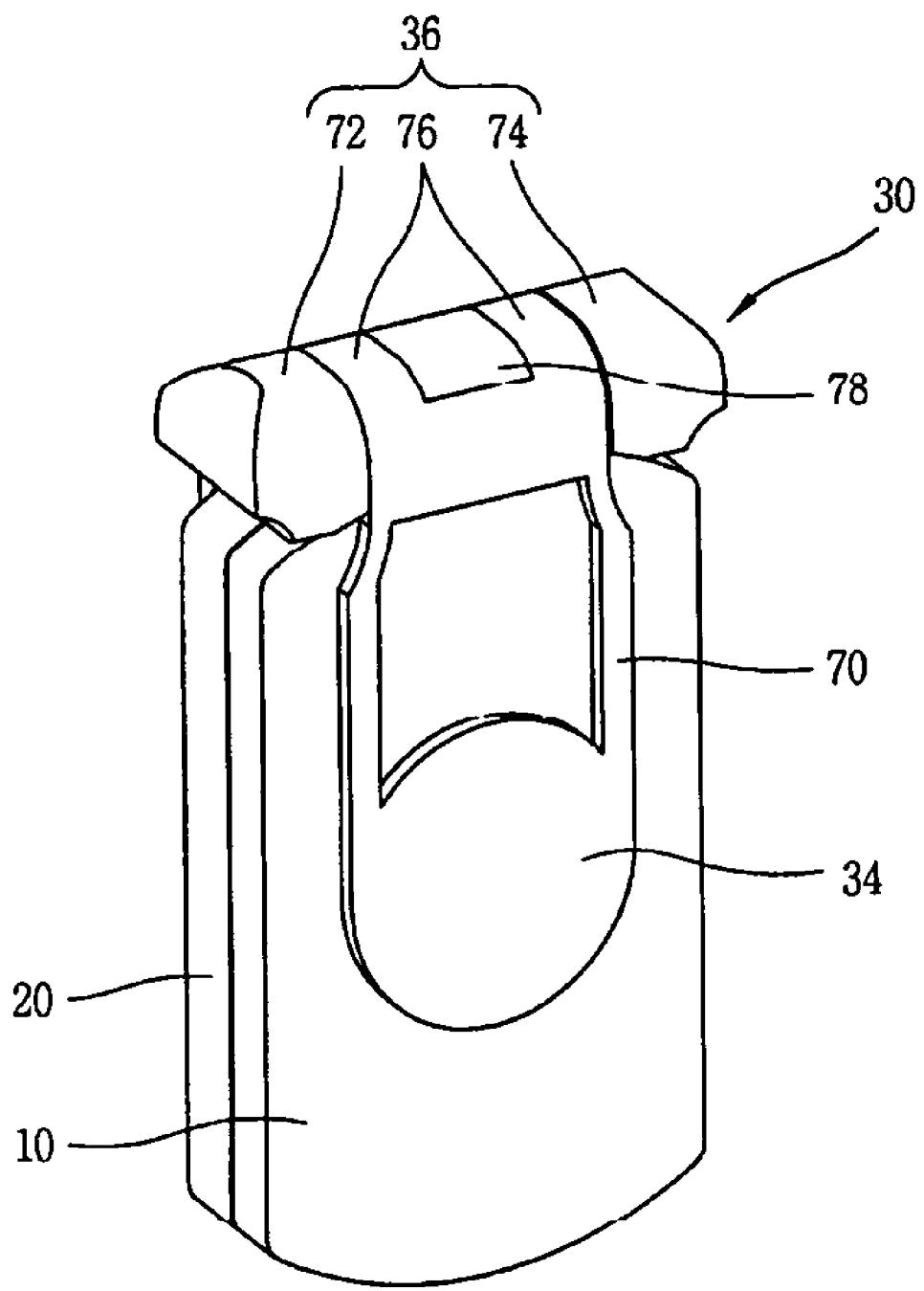
Figure 4:
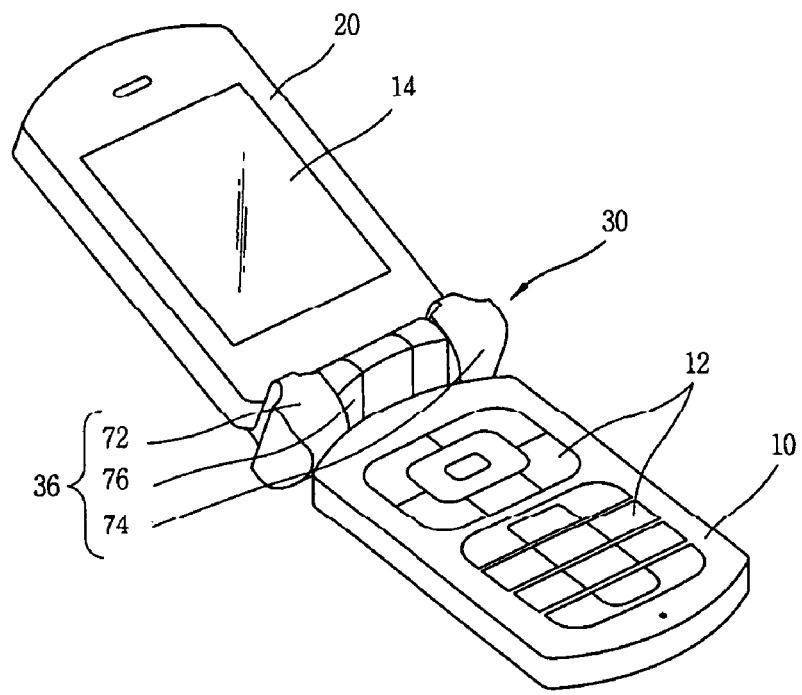
FIGS. 4 to 6 are perspective views showing the portable terminal in accordance with the present invention in an open position.
Figure 5:
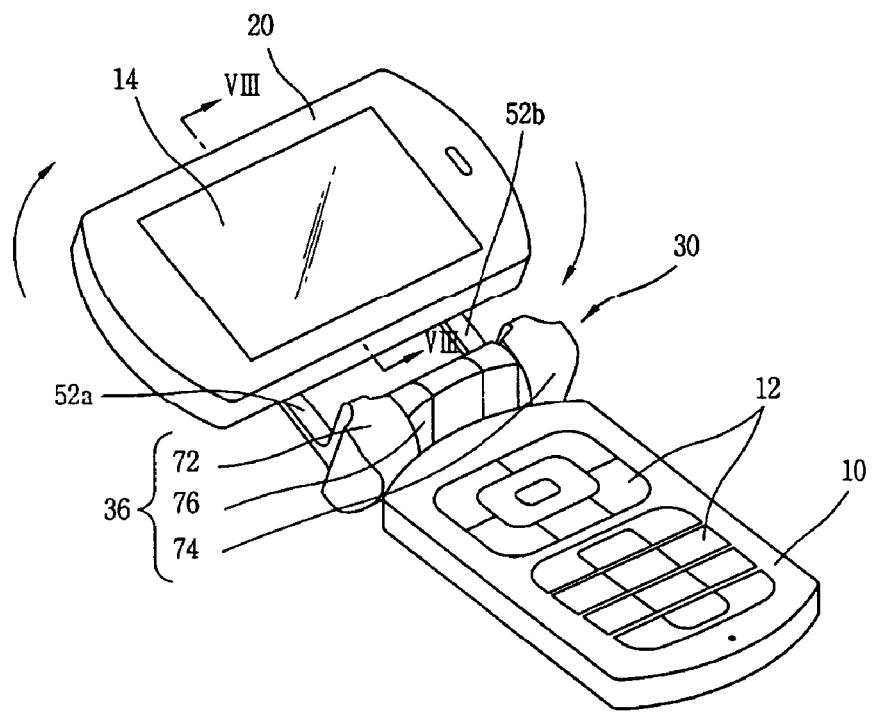
Figure 6:
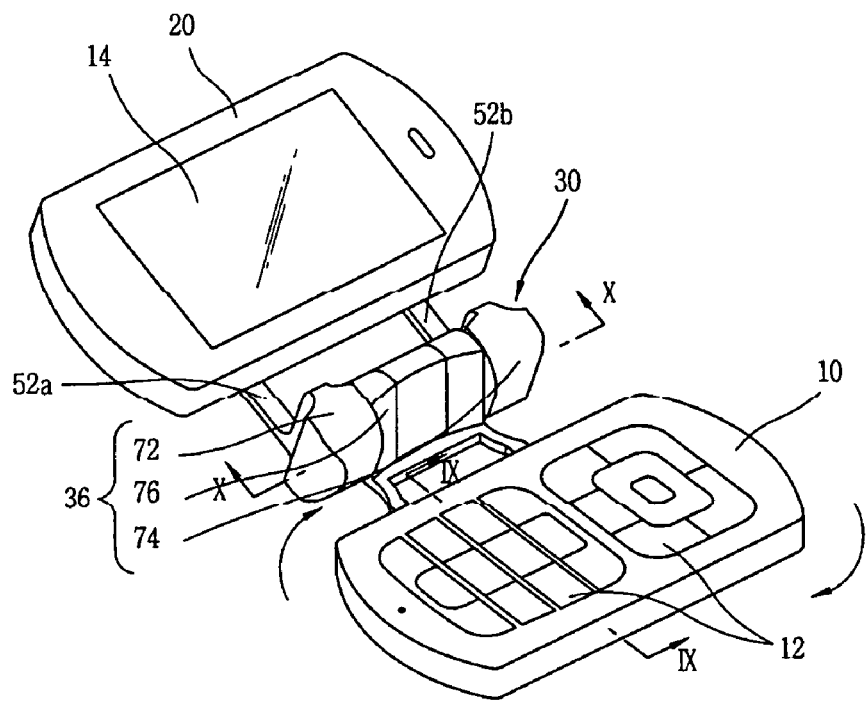

FIGS. 2 and 3 are perspective views showing a portable terminal in accordance with the present invention in a closed configuration, and FIGS. 4 to 6 are perspective views showing embodiments of the portable terminal in accordance with the present invention.

Referring now to FIG. 2, the portable terminal in accordance with the present invention includes: a terminal body 10 having a main PCB provided therein with various circuit components and having a keypad 12 at its front surface; a display unit 20 rotatably connected to the terminal body 10 and having display screen for displaying information desired by a user; and a hinge unit 30 mounted between the terminal body 10 and the display unit 20, rotatably supporting the display unit 20 so as to dispose the display unit 20 crosswise, and also rotatably supporting the terminal body 10 so as to dispose the terminal body 10 crosswise.

A main display screen 14 as shown in FIG. 4 for displaying information is mounted inside the display unit 20 in a longitudinal direction, and a secondary display screen 16 as shown in FIG. 2 is mounted outside the display unit 20.

Figure 7:
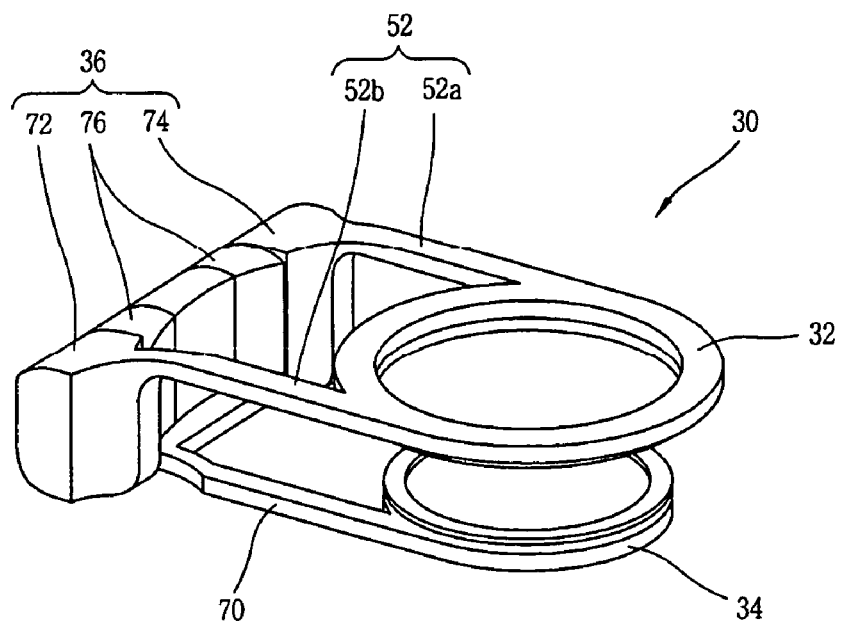
FIG. 7 is a perspective view of a hinge unit of the portable terminal in accordance with the present invention.
Figure 8:
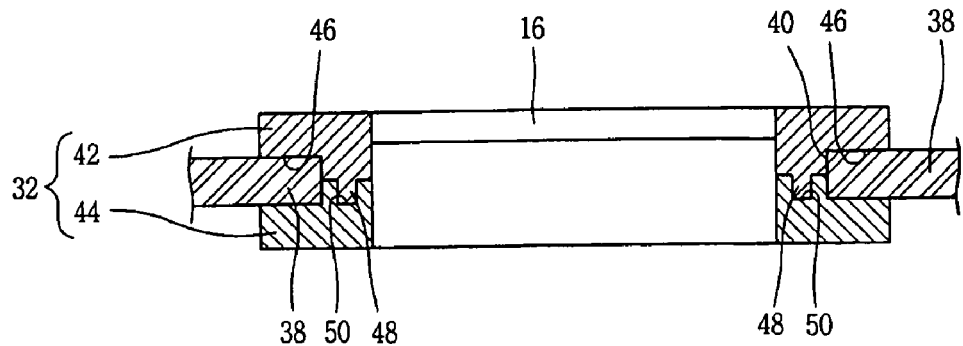
FIG. 8 is a sectional view taken along line VIII-VIII of FIG. 5.
Figure 9:
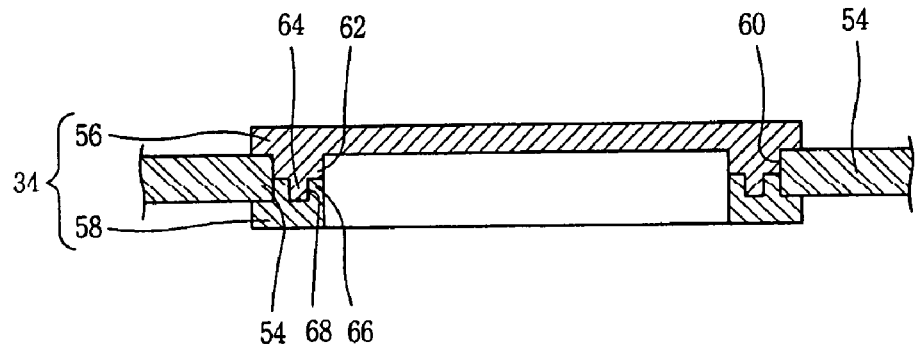
FIG. 9 is a sectional view taken along line IX-IX of FIG. 6.
Figure 10:
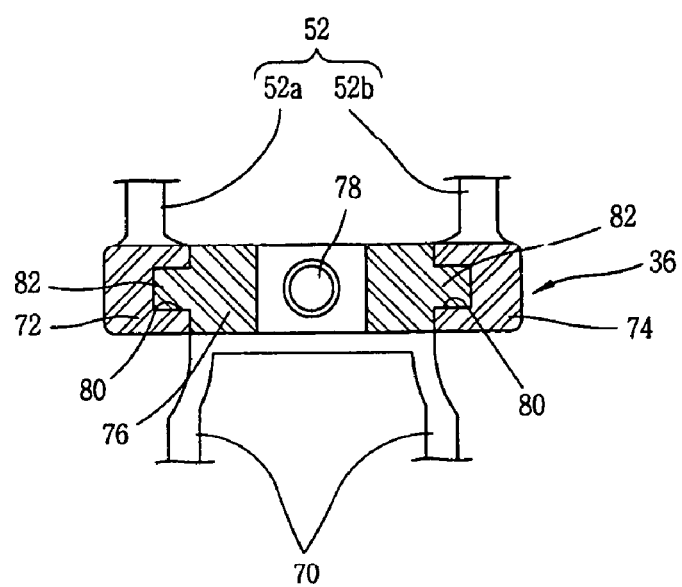
FIG. 10 is a sectional view taken along line X-X of FIG. 6.

FIG. 7 is a perspective view of a hinge unit in accordance with the present invention, FIG. 8 is a sectional view of a display unit hinge portion of the hinge unit in accordance with the present invention, FIG. 9 is a sectional view of a terminal body hinge portion of the hinge unit in accordance with the present invention, and FIG. 10 is a sectional view of a hinge connection portion of the hinge unit in accordance with the present invention.

Referring now to FIG. 7, The hinge unit 30 includes: a display unit hinge portion 32 rotatably supporting the display unit 20; a terminal body hinge portion 34 rotatably supporting the terminal body 10; and a hinge connection portion 36 connected between the display unit hinge portion 32 and the terminal body hinge portion 34, for connecting the two hinge portions 32 and 34 to each other such that they can be rotated relative to each other.

As shown in FIG. 8, the display unit hinge portion 32 includes: a first rotation member 42 disposed at an upper surface of an outer cover 38 of the display unit 20 and inserted in a hinge hole 40 formed at the outer cover 38; and a second rotation member 44 disposed at a lower surface of the outer cover 38 of the display unit 20 and inserted in the hinge hole 40 and coupled with the first rotation member 42.

Here, the first rotation member 42 and the second rotation member 44 are formed as a ring. When the first rotation member 42 and the second rotation member 44 are coupled together, a groove 46 is formed in a circumferential direction such that the outer cover of the display unit 38 is secured within the groove 46.

Here, the groove 46 may be formed at the first rotation member 42, at the second rotation member 44, or at both the first and second rotation members 42 and 44.

A secondary display screen 16 is mounted at an inner circumferential surface of the first rotation member 42.

Coupling protrusions 48 are formed at a lower surface of the first rotation member 42 at regular intervals in a circumferential surface, and coupling grooves 50 are formed at an upper surface of the second rotation member 44. Thus, when the coupling protrusion 48 is coupled with the coupling groove 50, the first rotation member 42 and the second rotation member 44 are coupled together. Accordingly, the display unit hinge portion 32 rotatably supports the display unit 20 as shown in FIG. 5.

A connection member 52, FIG. 10, connected to the hinge connection portion 30 is integrally formed at one side of the first rotation member 42. The connection member 52 includes a first rod 52a extendingly formed at one side of the first rotation member 42, and a second rod 52b disposed parallel to the first rod 52a and extendingly formed at the other side of the first rotation member 42.

In alternative embodiments not shown (the reference number refer to FIGS. 8 and 9, and wherein the reference numbers identify similar structures), the display unit hinge portion 32 may include a circular flange portion 42, wherein the circular flange portion is inserted into the hinge hole 40 of the display unit outer cover 38. The display unit outer cover 38 is secured to the display unit hinge portion using a retaining ring 44. The retaining ring 44 may also include a flange, although this flange is not necessary if the circular flange portion 42 extends along the thickness of the outer cover of the display unit 38. Alternatively, the circular flange portion may be omitted if the retaining ring 44 has a flange portion that extends along the thickness of the outer cover of the display unit 38. The retaining ring 44 is then secured to the circular flange portion 42, or to the display unit hinge portion 32 if the circular flange portion 42 is not provided.

As shown in FIG. 9, the terminal body hinge portion 34 includes: a first rotation member 56 disposed at an upper surface of an outer cover 54 of the terminal body 10 and inserted in a hinge hole 60 formed at the outer cover 54; and a second rotation member 58 disposed at a lower surface of the outer cover 54 of the terminal body 10, inserted in the hinge hole 60 and coupled with the first rotation member 56.

The first rotation member 56 is formed as a disc shape, and a hinge protrusion 62 inserted in the hinge hole 60 is formed at a lower surface of the first rotation member 56 in a circumferential direction, and coupling protrusions 64 coupled with the second rotation member 58 are formed at a surface of the hinge protrusion 62 at regular intervals.

The second rotation member 58 is formed in a circular ring type, and a hinge protrusion 66 inserted in the hinge hole 60 and contacting with the hinge protrusion 62 of the first rotation member 56 is formed at an upper surface of the second rotation member 58 in a circumferential direction. Coupling grooves 68 are formed at the hinge protrusion 66 so that the coupling protrusions 64 of the first rotation member 56 are inserted therein and coupled therewith.

Here, a diameter of the terminal body hinge portion 34 is preferably smaller than that of the display unit hinge portion 32.

A connection member 70 connected to the hinge connection portion is integrally formed at one side of the first rotation member 56.

As described above, the terminal body hinge portion 34 rotatably supports the terminal body 10 as the hinge protrusions 62 and 66 of the first rotation member 56 and the second rotation member 58 are respectively inserted in the hinge hole 60 formed at the outer cover 54 of the terminal body 10.

In alternative embodiments not shown (the reference number refer to FIGS. 8 and 9, and wherein the reference numbers identify similar structures), the terminal body hinge portion 34 may include a circular flange portion 56, wherein the circular flange portion is inserted into the hinge hole 60 of the terminal body outer cover 54. The terminal body outer cover 54 is secured to the terminal body hinge portion using a retaining ring 58. The retaining ring 58 may also include a flange, although this flange is not necessary if the circular flange portion 56 extends along the thickness of the terminal body outer cover 54. Alternatively, the circular flange portion may be omitted if the retaining ring 58 has a flange portion that extends along the thickness of the terminal body outer cover 54. The retaining ring 58 is then secured to the circular flange portion 56, or to the terminal body hinge portion 34 if the circular flange portion 56 is not provided.

As shown in FIG. 10, the hinge connection portion 36 includes: a first hinge member 72 connected to the first rod 52a formed at the display unit hinge portion 32; a second hinge member 74 connected to the second rod 52b of the display unit hinge portion 32; and a third hinge member 76 rotatably disposed between the first hinge member 72 and the second hinge member 74 and connected to the connection member 70 of the terminal body hinge portion 34.

Here, hinge grooves 80 are formed at side surfaces of the first hinge member 72 and the second hinge member 74 which face each other, respectively, and hinge protrusions 82 are formed at both sides of the third hinge member so as to be rotatably inserted in the two hinge grooves 80, respectively.

A camera 78 for video capturing video images is rotatably mounted at the third hinge member 76.

The operation of the portable terminal in accordance with the present invention having such a structure will now be described.

First, when the portable terminal is in a common communication mode, as shown in FIG. 4, the display unit 20 is opened from the terminal body 10 by the hinge connection portion 36, and then communication is made in a state that the terminal body 10 and the display unit 20 are disposed in a longitudinal direction.

At this time, the third hinge member 76 connected to the terminal body 10, and the first hinge member 72 and the second hinge member 74 which are connected to the display unit 20 are rotated relative to one another to thereby open the display unit 20.

A user may rotate the display unit 20 relative to the terminal body 10 until the display unit 20 is at a right angle to the terminal body 10, thereby enabling the user to view the display screen 14 in a wide screen mode.

Since the display unit 20 is rotatably supported by the display unit hinge portion 32, the display unit 20 can be rotated to a right angle with the terminal body 10.

When a function of the portable terminal requires many key manipulations, such as a game, both the display unit 20 and the terminal body 10 may be rotated at a right angles to the hinge 30 as shown in FIG. 6.

At this time, the display unit 20 is rotatably supported by the display unit hinge portion 32, and the terminal body 10 is rotatably supported by the terminal body hinge portion 34.

As so far described, the portable terminal in accordance with the present invention can rotate both the terminal body 10 and the display unit 20 as a hinge unit comprises a display unit hinge portion for rotatably supporting the display unit, a terminal body hinge portion for rotatably supporting the terminal body, and a hinge connection portion connecting the terminal body hinge portion with the display unit hinge portion such that they can be rotated relative to each other. Accordingly, the portable terminal can perform functions requiring many key manipulations like games, and thus various functions can be additionally installed in the terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

I claim:

1. A portable terminal comprising:
    a terminal body having a keypad;
    a display unit having first display screen; and
    a hinge unit comprising a display unit hinge portion and a terminal body hinge portion, wherein the display unit hinge portion is rotatably coupled to the terminal body hinge portion thereby defining a hinge axis, and wherein the display unit having a major axis and a minor axis is rotatably mounted on the display unit hinge portion, wherein the display unit major axis is rotatable from being perpendicular to the hinge axis to being parallel to the hinge axis, and
    a second display screen disposed on an outer surface of the display unit and visible through the display unit hinge portion,
    wherein the terminal body has a major axis and a minor axis and is mounted on the terminal body hinge portion, the terminal body major axis being rotatable from being perpendicular to the axis of rotation to being parallel to the hinge axis, and
    wherein the terminal body hinge portion comprises:
        a second retaining flange disposed on the terminal body hinge portion for inserting into a circular hole formed on a lower surface of the terminal body, wherein a second coupling protrusion is formed at an upper surface of the second retaining flange, and
        a second retaining ring coupled with the terminal body hinge portion for securing the terminal body to the terminal body hinge portion and for enabling rotation of the terminal body with respect to the terminal body hinge portion, wherein a second coupling groove is formed on a lower surface of the second retaining ring into which the second coupling protrusion is inserted, and a flange portion is inserted into the circular hole formed on the lower surface of the terminal body.

2. The terminal of claim 1, wherein the display unit hinge portion comprises:
    a first retaining flange disposed on the display unit hinge portion for inserting into a circular hole formed in a cover of the display unit, and
    a first retaining ring coupled with the first retaining flange for securing the display unit cover to the display unit hinge portion and for enabling rotation of the display unit with respect to the display unit hinge portion.

3. The terminal of claim 2, wherein a first coupling protrusion is formed at a lower surface of the first retaining flange, and a first coupling groove is formed on an upper surface of the first retaining ring into which the first coupling protrusion is inserted.

4. The terminal of claim 1, wherein the display unit hinge portion comprises a first retaining ring having a flange portion, wherein the flange portion of the first retaining ring is inserted into a circular hole formed in a cover of the display unit, and wherein the first retaining ring is coupled to the display unit hinge portion securing the display unit to display unit hinge portion, and enabling rotation of the display unit with respect to the display unit hinge portion.

5. The terminal of claim 4, wherein a coupling protrusion is formed at a lower surface of the display unit hinge portion, and a coupling groove is formed on an upper surface of the flange portion of the retaining ring into which the coupling protrusion is inserted.

6. The terminal of claim 1, wherein a second coupling protrusion is formed at an upper surface of the terminal body hinge portion, and a second coupling groove is formed on a lower surface of the flange portion of the second retaining ring into which the second coupling protrusion is inserted.

7. The terminal of claim 1, wherein the hinge unit further comprises a camera for capturing video images.

* * * * *